Dec. 10, 1929.  G. J. ABBOTT  1,738,552
VARIABLE SPEED GEAR
Filed Jan. 12, 1928
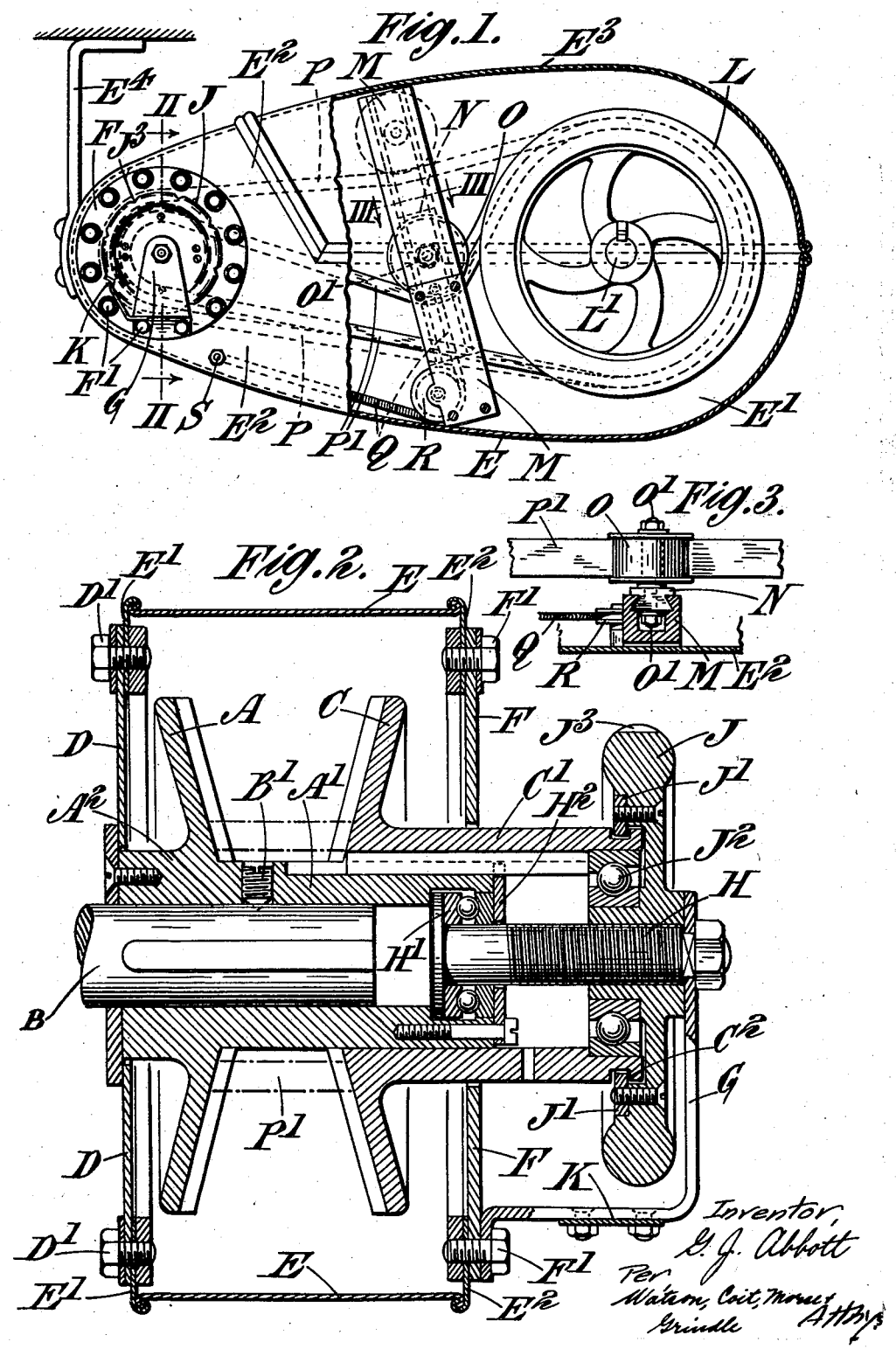

Patented Dec. 10, 1929

1,738,552

UNITED STATES PATENT OFFICE

GEOFFREY JOSEPH ABBOTT, OF LONDON, ENGLAND, ASSIGNOR TO P. I. V. CHAIN GEARS LIMITED, OF LONDON, ENGLAND, A COMPANY OF GREAT BRITAIN

VARIABLE-SPEED GEAR

Application filed January 12, 1928. Serial No. 246,337, and in Great Britain February 16, 1927.

This invention relates to variable speed gears of the kind comprising a pulley of fixed diameter and an expanding pulley connected by means of a flexible power transmission belt or chain, furnished with a belt tensioning idler roller which is automatically maintained in contact with the slack side of the belt whatever the effective diameter of the expanding pulley. The invention is primarily intended for use with pulleys having alternate ribs and depressions on their oppositely inclined flanges and connected by means of a chain or belt of the self-pitching type, as described in the present applicant's prior Letters Patent of the United States of America No. 1,601,662 and No. 1,637,402.

To obtain the best results with gears of the above type, it is important for the chain to be protected from dust or grit and to be properly lubricated, and the object of the present invention is to provide a totally enclosed gear which can be readily connected as a unit to a shaft.

According to this invention the shaft which carries the expanding pulley—preferably the driving shaft—is surrounded by a plate or disc which does not participate in the rotary movement of the shaft, a frame or spider being mounted on the plate carrying the mechanism for varying the effective diameter of the expanding pulley, and a gear case, which totally encloses both the pulleys and the driving chain, being also secured to the plate. Mounted to slide in guides within the gear case is an idler shoe or roller which is maintained in contact with the slack side of the chain by means of one or more springs which are led over one or more pulleys within the casing, thus enabling relatively long springs to be used in a gear case of minimum dimensions.

The mechanism for varying the effective diameter of the expanding pulley is preferably actuated from outside the casing and conveniently comprises a screwthreaded member or any other suitable device for moving one flange of the pulley in an axial direction upon its shaft.

A variable speed gear according to this invention can be applied as a self-contained unit to a prime mover—say to an electric motor—simply by keying or otherwise securing the driving pulley to the motor shaft, the gear case together with the driven shaft, chain and means for adjusting the driving pulley being all primarily carried by the plate and frame which surrounds the driving shaft. The portion of the driven shaft which extends outside the gear case is either directly coupled to the mechanism to be driven or a pulley is secured to this shaft from which the drive is transmitted by a belt, chain or any other convenient means.

One construction according to this invention is illustrated by way of example in the accompanying drawings in which:—

Figure 1 is a side elevation showing the gear casing partly in section,

Figure 2 is a section on an enlarged scale on the line II—II of Figure 1 showing the expanding pulley, and Figure 3 is a section on the line III—III of Figure 1, also on an enlarged scale, showing the idler roller and its guide.

In the construction shown the expanding pulley comprises a fixed flange A which is bored to fit the spindle B of the motor or other prime mover to which it is secured as by a grub screw $B^1$, so as to rotate therewith. This fixed flange is provided with a splined extension sleeve $A^1$ upon which is mounted to slide the movable pulley flange C. The inclined faces of both the flanges A and C are furnished with alternate ribs and depressions, the rib on one flange being opposite the depression on the opposite flange, as in the known construction above refererd to.

Loosely surrounding the outer end $A^2$ of the fixed flange A is a disc or plate D which does not participate in the rotary motion of the shaft B. The plate D is attached to the inner wall $E^1$ of a gear case E by studs $D^1$, and the outer wall $E^2$ of the casing is similarly attached by studs $F^1$ to a plate F which loosely surrounds an extension $C^1$ of the movable flange C. The gear case is supported by any suitable arm or bracket such as that diagrammatically illustrated at $E^4$ in Figure 1.

Secured to the plate F is an arm or bracket

G which supports the outer end of a fixed screwthreaded spindle H coaxial with the shaft B and supported at its inner end in a thrust bearing H$^1$ held by a thrust plate H$^2$ in the bore of the extended portion A$^1$ of the fixed flange A.

The screwthreaded spindle H carries an internally screwthreaded hand wheel J provided with a detachable two-part ring or flange J$^1$ which engages a groove C$^2$ near the outer end of the tubular extension C$^1$ of the movable flange C, a ball bearing J$^2$ being interposed between the bore of the extension C$^1$ and the boss of the wheel J to prevent the rotation of the flange being imparted to the wheel. A locking device is also provided for the wheel which in the example illustrated comprises an arm K secured to the bracket G and adapted to engage serrations or notches J$^3$ in the rim of the hand wheel and so hold it in its adjusting position.

It will be seen from Figures 2 that when the hand wheel J is rotated upon the fixed spindle H it will impart axial movement to the flange C without interfering with the rotation of either of the flanges and thus varies the effective diameter of the driving pulley.

The gear case, which comprises side walls E$^1$ E$^2$ connected by a strip E, is preferably formed of sheet metal and is in two parts, the main or lower portion of the case permanently enclosing the entire driving pulley and the lower half of the driven pulley L, whilst the upper portion E$^3$, which when in place completely encloses the rest of the gear, is more readily removable. Any known form of securing device may be employed to connect the two portions of the gear case together. In a convenient arrangement the adjacent edges of the two portions of the case are stiffened by a wire as shown to form a beaded edge to which any suitable number of clips of known type (not illustrated) may be attached.

Secured to the inner face of the lower side wall E$^2$ of the case is a guide member M in which is mounted to slide a block N carrying the pivot or spindle O$^1$ of an idler roller O which bears upon the slack side of the chain shown by dotted lines P in one extreme position, and by full lines P′ in the other extreme position. To maintain the idler roller O in contact with the chain, whatever the effective diameter of the driving pulley, the idler roller O is spring-controlled, and since the tension in the spring is normally smallest when the chain is slackest, it has been found necessary to make use of a relatively long tension spring. To this end according to this invention one end of a coiled spring Q is secured to the sliding block N which carries the idler roller and, instead of terminating at the base of the guide, this spring is led over a pulley R pivotally mounted to the base of the guide member M and is taken to a point near the extreme end of the gear case, where its other end is anchored, as shown, by a bolt S. Thus the spring Q is of considerable effective length without increasing the external dimensions of the gear case, and, as a result, the idler roller O is able to maintain the necessary tension upon the slack side of the chain, even when the driving wheel is working at its minimum diameter with the maximum slackness of chain as shown by full lines P′.

It will be appreciated that the driven pulley L which is mounted on a shaft L$^1$, the ends of which project outside the gear case, is of fixed diameter and its flanges are also furnished with alternate ribs and depressions so as to be engaged by the self-pitching chain.

Any suitable bearings or supports may be furnished for the driven shaft L$^1$ but when the gear is designed for direct application to the driving and driven shafts, it is merely necessary to key the driving and driven pulleys to these two shafts.

With a gear case according to this invention the chain is entirely protected from the effects of dirt or neglect since the lower portion of the gear case will contain sufficient lubricant to ensure the thorough lubrication of the chain, and any form of oil retaining device may be provided for the bearings of the shafts.

It will be understood that the constructional details may be considerably varied and that two or more tension springs passing over any required number of guide pulleys may be used if desired and a "shoe" used in place of an idler pulley without departing from this invention.

What I claim as my invention and desire to secure by Letters Patent is:—

1. In a variable speed gear of the expanding pulley type the combination of a driving pulley having at least one of its flanges axially adjustable to vary its effective diameter, a second pulley of fixed diameter, a casing enclosing both pulleys, means supported on the exterior of the casing for imparting axial adjustment to the movable flange, a flexible transmission member connecting the pulleys, a guide secured to the inner wall of the casing, belt tensioning means mounted to slide within said guide so as to bear upon the slack side of the transmission member, a relatively long spiral spring anchored at one end to the casing and secured at the other end to said belt tensioning means and a guide pulley within the casing over which the spring passes.

2. In a variable speed gear of the kind comprising a pulley of fixed diameter and an expanding pulley each having alternate ribs and depressions on their oppositely inclined faces and connected by means of a flexible transmission member of the self-pitching type the combination of a casing enclosing both pulleys, means supported on the exterior of the casing for varying the effective diameter of the expanding pulley, a guide secured to the inner wall of the casing, belt tensioning means mounted to slide within said guide so as to bear upon the slack side of the transmission member, a relatively long spiral spring anchored at one end to the casing and secured at the other end to said belt tensioning means and a guide pulley within the casing over which the spring passes.

3. In a variable speed gear of the expanding pulley type having a pulley of variable effective diameter, a second pulley, and a flexible transmission member connecting the two pulleys, the combination with a casing for enclosing said pulleys, of a guide secured to the inner wall of the casing intermediate the two pulleys and extending transversely of said transmission member, a support slidable on said guide, an idler pulley mounted on said support and engaging the slack run of the flexible transmission member, a pulley mounted on said guide, and resilient means anchored at one end to said casing, extending over said last mentioned pulley and secured to said support for urging the latter in a direction to tension said slack run and toward said tight run.

4. In a variable speed gear of the expanding pulley type having a pulley of variable effective diameter, a second pulley, and a flexible transmission member connecting the two pulleys, the combination with a casing for enclosing said pulleys, of a grooved guide secured to the inner wall of the casing intermediate the two pulleys and extending transversely of said transmission member, a support slidably engaged within said groove, an idler pulley mounted on said support and engaging the slack run of the flexible transmission member, a pulley mounted on said guide, and resilient means anchored at one end to said casing, extending over said last mentioned pulley and secured to said support for urging the latter in a direction to tension said slack run and toward said tight run.

In testimony whereof I have signed my name to this specification.

GEOFFREY JOSEPH ABBOTT.